United States Patent
Mushika et al.

(10) Patent No.: US 6,633,641 B1
(45) Date of Patent: Oct. 14, 2003

(54) KEY INPUT DEVICE

(75) Inventors: Motoaki Mushika, Higashiosaka (JP); Hiroyuki Konishi, Higashiosaka (JP)

(73) Assignee: Sanyo Electric Co., LTD, Osaka (JP)

( * ) Notice: Subject to any disclaimer, the term of this patent is extended or adjusted under 35 U.S.C. 154(b) by 378 days.

(21) Appl. No.: 09/624,218

(22) Filed: Jul. 24, 2000

(30) Foreign Application Priority Data

Aug. 27, 1999 (JP) .............................. 11-242160

(51) Int. Cl.⁷ ................................ H04M 1/00
(52) U.S. Cl. ................... 379/368; 379/433.07
(58) Field of Search .................. 379/368, 433.07; 455/90; 200/159 B, 5 R, 5 D, 5 E, 5 A (56) References Cited

U.S. PATENT DOCUMENTS 4,194,105 A * 3/1980 Hodges ................... 200/159 B

FOREIGN PATENT DOCUMENTS

| JP | 01-149329 | 6/1989 |
| JP | 3-13951 | 3/1991 |
| JP | 3-23639 | 5/1991 |
| JP | 4-60286 | 9/1992 |
| JP | 07-320588 | 12/1995 |
| JP | 07-320589 | 12/1995 |

* cited by examiner

Primary Examiner—Jack Chiang
(74) Attorney, Agent, or Firm—Armstrong, Westerman & Hattori, LLP (57) ABSTRACT

A key input device comprises a dome sheet 7 provided over a base plate 5 and having a plurality of dome portions, and a plurality of manual keys disposed above the dome sheet 7 for depressing the respective dome portions. Each of the dome portions is elastically restorably inverted by being depressed by the corresponding manual key to close contacts. The dome sheet 7 has a flat sheet portion 70 formed around the dome portions and comprising an inner region 74 extending inwardly of dome portions 72 to be selectively depressed by a seesaw key 15, and an outer region 73 extending outwardly of the dome portion 72. A spacer sheet 6 is interposed between the base plate 5 and the dome sheet 7 to thereby position the inner region 74 of the flat sheet portion 70 of the dome sheet 7 at a lower level than the outer region 73. Accordingly, key contacts can be reliably closed by the seesaw key 15.

2 Claims, 9 Drawing Sheets

KEY INPUT DEVICE

FIELD OF THE INVENTION

The present invention relates to key input devices for use in portable telephones and the like, and more particularly to a key input device comprising a plurality of manual keys including a seesaw key adapted to selectively close one of pairs of key contacts.

BACKGROUND OF THE INVENTION

Figure 8:
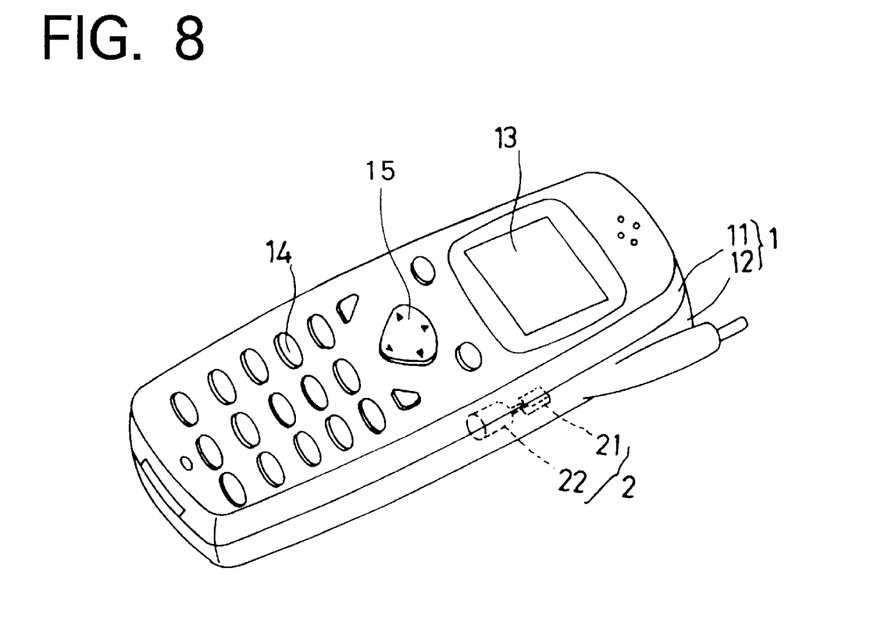
FIG. 8 is a perspective view showing the appearance of a portable telephone.

With reference to FIG. 8, portable telephones usually have a casing 1 formed by a front case 11 and a rear case 12. A display 13 and a plurality of manual keys 14 are arranged on the surface of the front case 11. These manual keys 14 include a seesaw key 15 for use in selecting one of functions. The illustrated seesaw key 15 is adapted to selectively close one of four pairs of key contacts for the selection of the corresponding function.

Figure 9:
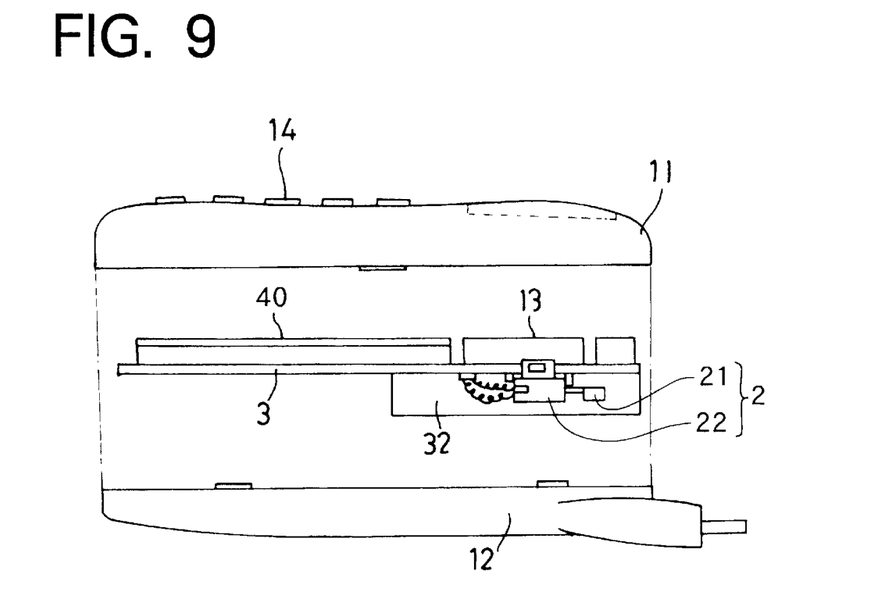
FIG. 9 is an exploded side elevation of the portable telephone.

The casing 1 has a circuit board 3 disposed in its interior as shown in FIG. 9. Arranged on the circuit board 3 are a key sheet assembly 40 to be depressed by the manual keys 14, the display 13, a high-frequency circuit module 32, a vibrator 2 comprising a motor 22 and an eccentric weight 21 attached to the output shaft of the motor for notifying the user of incoming calls, etc.

Figure 10:
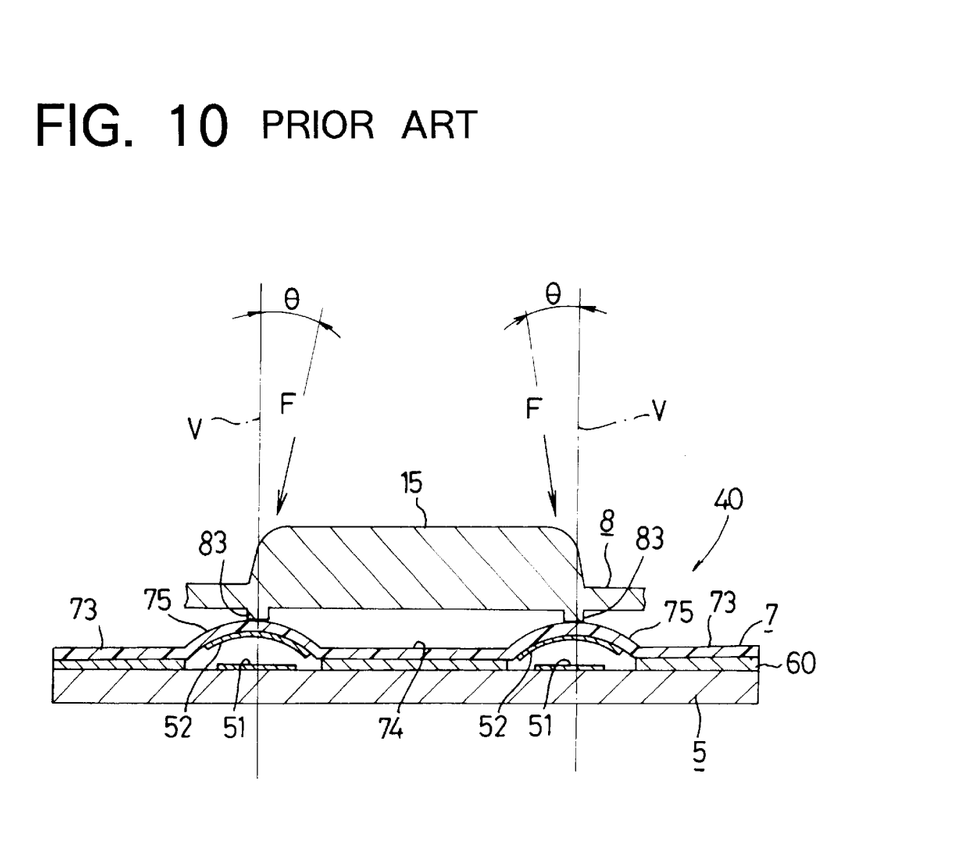
FIG. 10 is an enlarged view in section of a conventional key input device at the position of a seesaw key.
Figure 11:
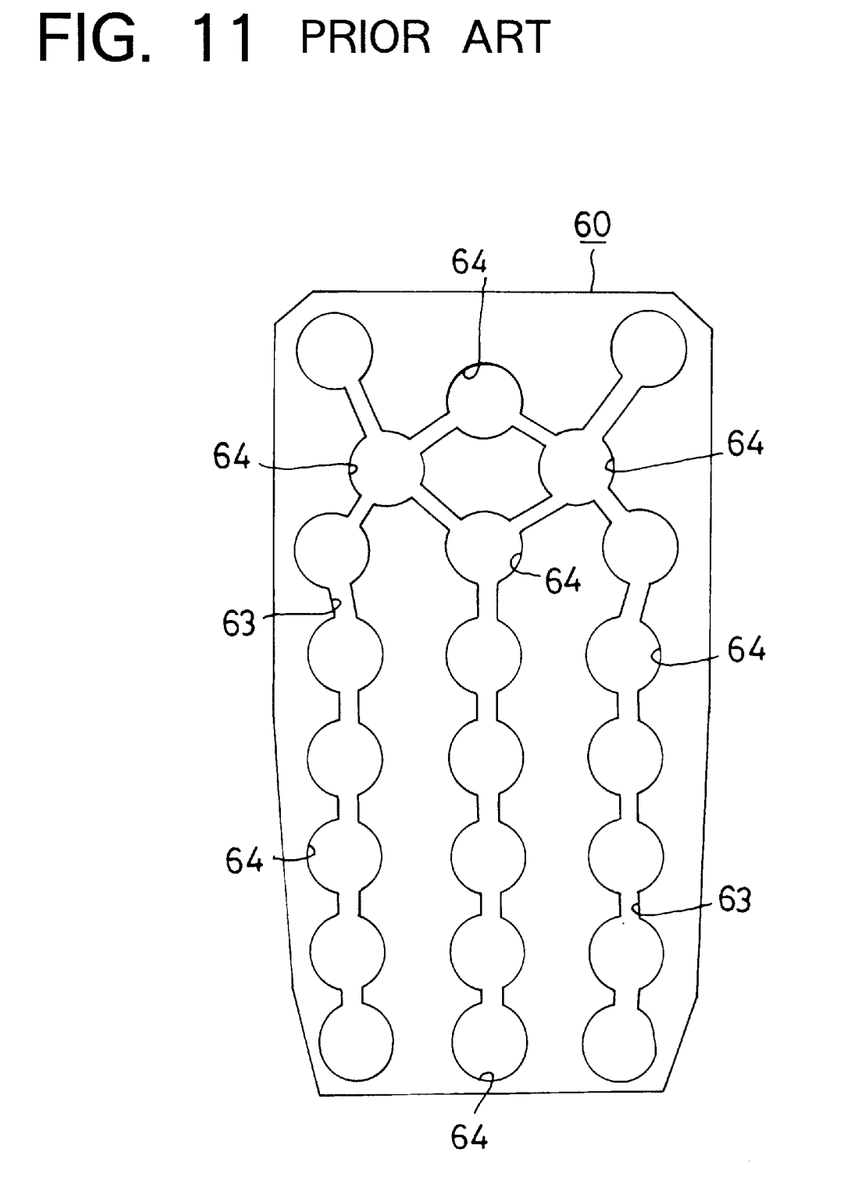
FIG. 11 is a plan view of a conventional spacer sheet.

With reference to FIG. 10, the key sheet assembly 40 has a dome sheet 7 of PET disposed over a base plate 5, with a spacer sheet 60 interposed therebetween, and having a plurality of upwardly bulging dome portions 75. The manual keys including the seesaw key 15 are arranged above the dome sheet 7 for depressing the respective dome portions 75. The spacer sheet 60 is formed with a plurality of circular holes 64 corresponding to the respective dome portions 75 and slotlike air vents 63 interconnecting these circular holes 64 as seen in FIG. 11.

With the key sheet assembly 40, the dome portion 75 is elastically restorably inverted by being depressed by the corresponding manual key to bring a contact terminal 52 provided on the inner surface of the dome portion 75 into contact with a contact electrode 51 provided on the surface of the base plate 5 to close a pair of contacts.

To reliably close the key contacts of the key sheet assembly 40, the contact terminal 52 on the inner surface of the dome portion 75 of the dome sheet 7 must be brought into contact with the contact electrode 51 on the surface of the base plate 5 over as large an area as possible. It is therefore necessary to depress the dome portion 75 vertically downward.

However, in the case of the dome portions 75 to be depressed by the seesaw key 15, a pusher 83 projecting downward from an end portion of the seesaw key 15 depresses the corresponding dome portion 75 in an oblique direction when the seesaw key 15 is moved. Stated more specifically with reference to FIG. 10, the pusher 83 of the seesaw key 15 exerts a depressing force F at an angle of θ with a center axis V extending through the dome portion 75 perpendicular thereto, consequently deforming the dome portion 75 to a distorted form and bringing the contact terminal 52 on the inner surface of the dome portion 75 into point contact with the contact electrode 51 on the base plate 5, hence the problem of failing to close the key contacts reliably.

SUMMARY OF THE INVENTION

Accordingly, an object of the present invention is to provide a key input device which is adapted to close key contacts reliably even with a seesaw key.

The present invention provides a key input device which comprises a dome sheet 7 disposed over a base plate 5 and having a plurality of upwardly bulging dome portions 71, and a plurality of manual keys 14 arranged above the dome sheet 7 for depressing the respective dome portions 71, the manual keys 14 including a seesaw key 15 adapted to selectively depress one of dome portions 72 included among the dome portions 71, each of the dome portions 71 being elastically restorably invertible by being depressed by the corresponding manual key 14 to bring a contact terminal 52 formed on an inner surface of the dome portion 71 into contact with a contact electrode 51 formed on a surface of the base plate 5 and close contacts.

The dome sheet 7 has a flat sheet portion 70 formed around the dome portions 71 and comprising an inner region 74 extending inwardly of the dome portions 72 to be selectively depressed by the seesaw key 15, and an outer region 73 extending outwardly of the dome portion 72, a spacer sheet 6 being interposed between the base plate 5 and the dome sheet 7 and being formed with a plurality of circular holes 61 corresponding to the respective dome portions 71, the interposed spacer sheet 6 providing a difference in level from the surface of the base plate 5 between the inner region 74 of the flat sheet portion 70 of the dome sheet 7 and the outer region 73 thereof, the inner region 74 being positioned at a lower level than the outer region 73.

Since the inner region 74 of the flat sheet portion of the dome sheet 7 is at a lower level than the outer region 73 thereof in the key input device of the present invention, each of the dome portions 72 to be selectively depressed by the seesaw key 15 is so inclined as to be positioned at a lower level toward the inner region 74 and at a higher level toward the outer region 73. Thus, each dome portion 72 has its center axis inclined with respect to a perpendicular to the surface of the base plate 5.

When one of these dome portions 72 is pushed by depressing the seesaw key 15, the center axis C extending through the dome portion 72 perpendicular thereto is accordingly positioned in the same or approximately the same direction as the direction in which the depressing force F of the seesaw key 1 acts. As a result, the dome portion 72 is deformed symmetrically about the center axis, bringing the contact terminal 52 on the inner surface of the dome portion 72 into contact with the corresponding contact electrode 51 on the base plate 5 over a sufficient area. Since the dome portion 72 deforms symmetrically about the center axis, this portion 72 enables the user to feel the same sharp click as when with the other manual keys 14 are depressed.

According to a specific embodiment of the invention, the spacer sheet 6 has an opening 65 formed inwardly of circular holes 62 corresponding to the respective dome portions 72 to be selectively depressed by the seesaw key 15 and including the circular holes 62, and the dome sheet 7 has its flat sheet portion 70 joined at the inner region 74 to the surface of the base plate 5 through the opening 65. With this embodiment, a level difference in match with the thickness of the spacer sheet 6 is provided between the inner region 74 of the flat sheet portion 70 of the dome sheet 7 and the outer region 73 thereof.

With the key input device of the present invention, the seesaw key 15, like the other keys, brings the contact terminal 52 on the inner surface of the dome portion 72 into contact with the corresponding contact electrode 51 on the base plate 5 over a sufficient area as described above, whereby the key contacts can be closed reliably.

DETAILED DESCRIPTION OF EMBODIMENT

A detailed description will be given below of the present invention as embodied for the portable telephone shown in FIGS. 8 and 9.

Figure 3:
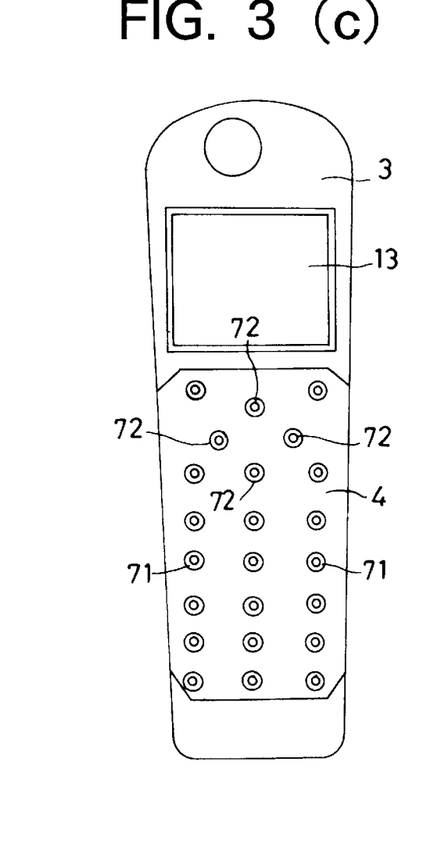
FIGS. 3(a), 3(b) and 3(c) are plan views showing a front case, a key sheet and a circuit board, respectively, of a portable telephone embodying the invention.

With the portable telephone of the present invention, the front case 11 constituting its casing is formed with an opening 16 for exposing the display 13, and a plurality of openings 17 for causing the manual keys 14 to project therethrough. These openings 17 include an opening 18 for positioning the seesaw key 15 therein as projected therefrom.

Disposed inside the front case 11 is a key sheet 8 of silicone rubber having the manual keys 14 formed integrally therewith. The manual keys 14 of the key sheet 8 include the seesaw key 15, which is adapted to selectively close one of four pairs of key contacts which are adjacent to one another.

The circuit board 3 to be disposed within the casing is provided thereon with the display 13 and a key sheet assembly 4 having a plurality of dome portions 71. The dome portions 71 of the key sheet assembly 4 include four dome portions 72 one of which is to be selectively depressed by the seesaw key 15.

Figure 4:
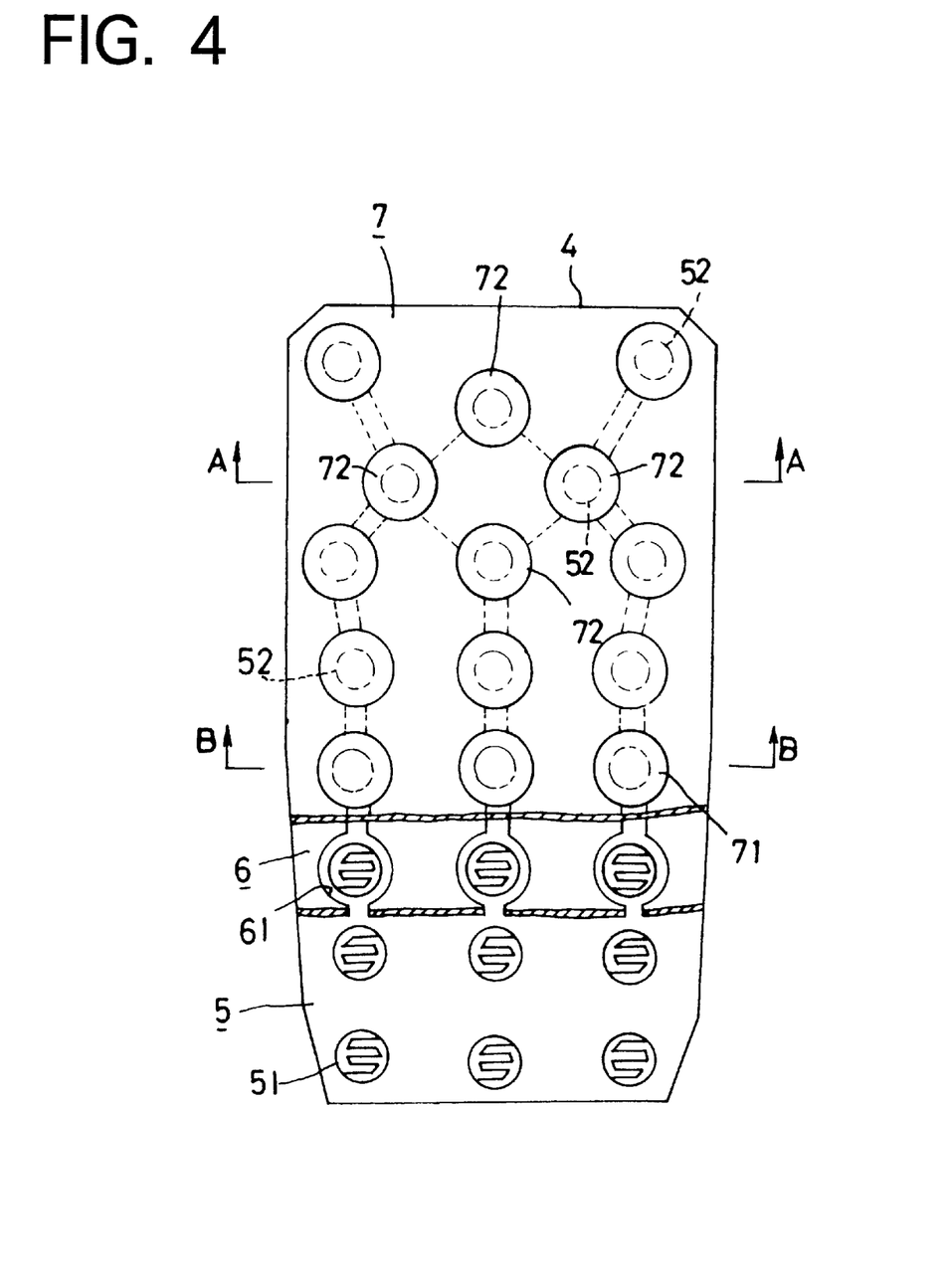
FIG. 4 is a plan view partly broken away of a key sheet assembly.
Figure 5:
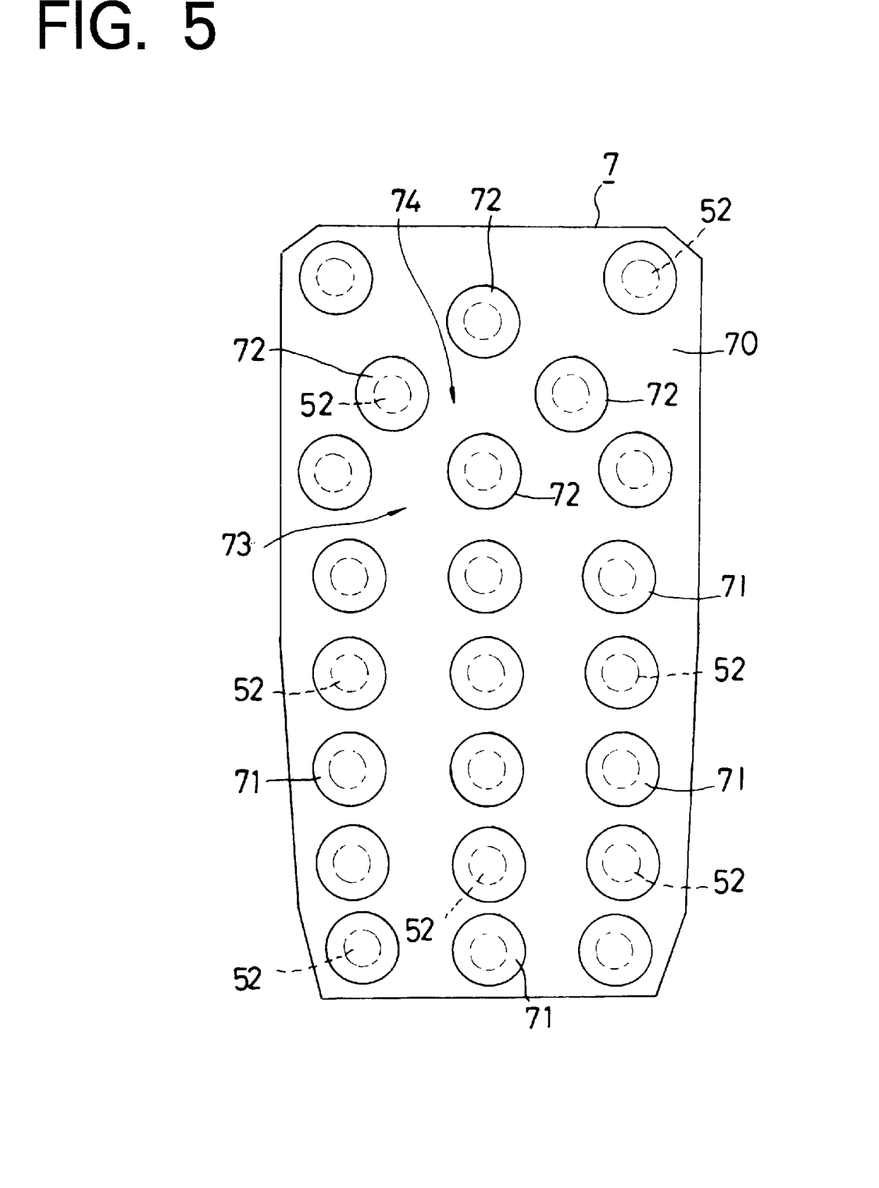
FIG. 5 is a plan view of a dome sheet.

As shown in FIG. 4, the key sheet assembly 4 comprises a spacer sheet 6 of PET provided over and joined to a base plate 5, and a dome sheet 7 of PET positioned over and joined to the spacer sheet 6. The dome sheet 7 comprises the dome portions 71 and a flat sheet portion 70 surrounding the dome portions 71 and integral therewith as seen in FIG. 5. A contact terminal 52 in the form of a circular carbon film is provided on the inner surface of each dome portion 71. The flat sheet portion 70 of the dome sheet 7 has an inner region 74 extending inwardly of the four dome portions 72 to be selectively depressed by the seesaw key 15, and an outer region 73 extending outwardly of the four dome portions 72.

Figure 6:
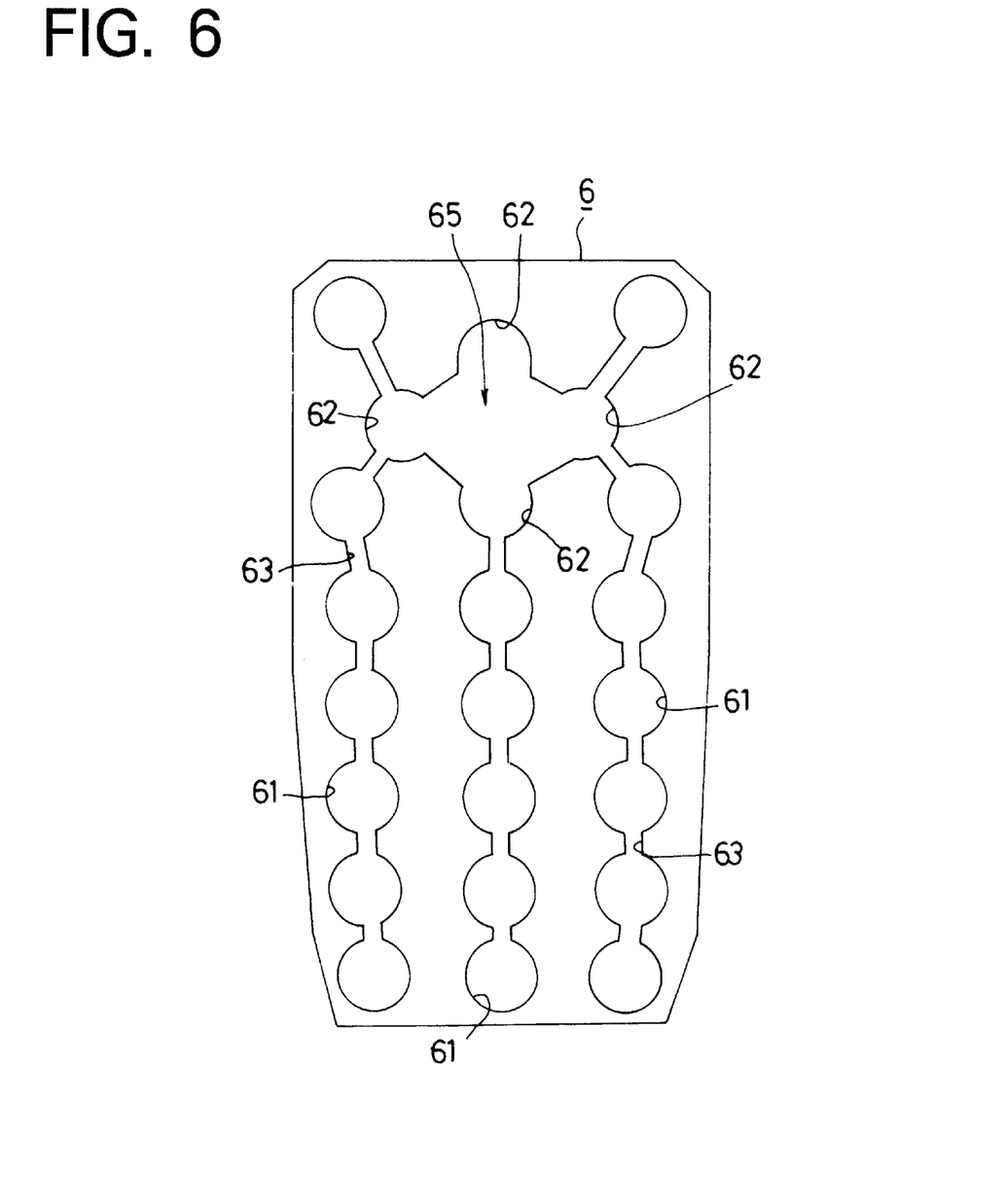
FIG. 6 is a plan view of a spacer sheet.

With reference to FIG. 6, the spacer sheet 6 is formed with a plurality of circular holes 61 corresponding to the respective dome portions 71 of the dome sheet 7, and slotlike air vents 63 interconnecting these circular holes 61. The spacer sheet 6 further has a large opening 65 which is positioned inwardly of four circular holes 62 corresponding to the respective four dome portions 72 to be selectively depressed by the seesaw key 15 and which is formed by cutting out the region surrounded by these four circular holes 62. The opening 65 is shaped to have a contour including the four dome portions 72 of the dome sheet 7 and the inner region extending inwardly of these dome portions 72. On the other hand, the conventional spacer sheet 60 shown in FIG. 11 has four circular holes 64 corresponding to the four dome portions 75 of the dome sheet 7, whereas these circular holes 64 are merely interconnected by slotlike air vents 63, with no opening formed inwardly of the four circular holes 64.

Figure 7:
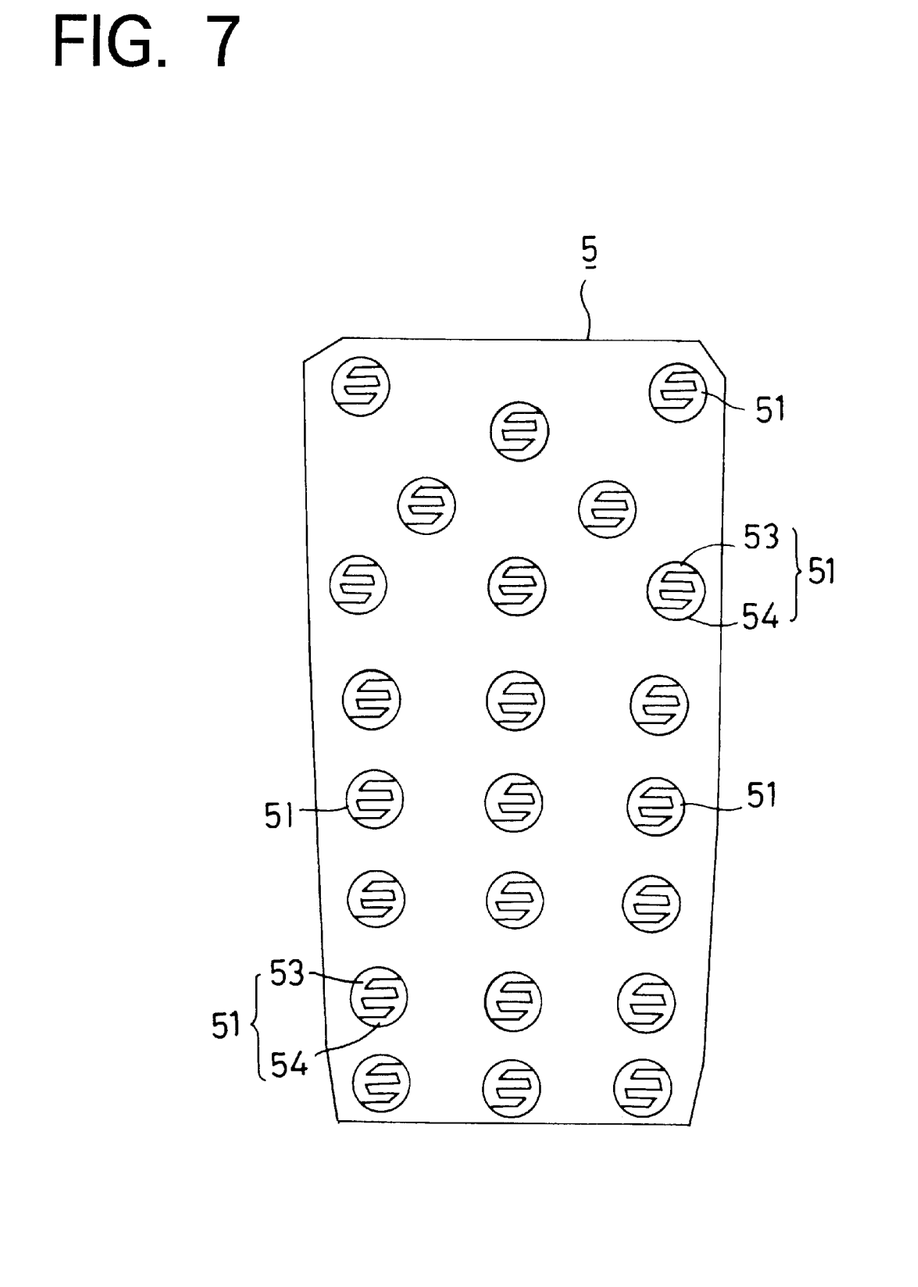
FIG. 7 is a plan view of a base plate.

With reference to FIG. 7, a contact electrode 51 comprising a pair of opposed comblike electrode pieces 53, 54 is formed on the surface of the base plate 5 in corresponding relation with each manual key 14. The contact of the contact terminal 52 on the inner surface of the dome portion 71 of the dome sheet 7 with the contact electrode 51 on the base plate 5 connects the pair of electrode pieces 53, 54 of the contact electrode 51 to each other to close the contacts.

Figure 2:
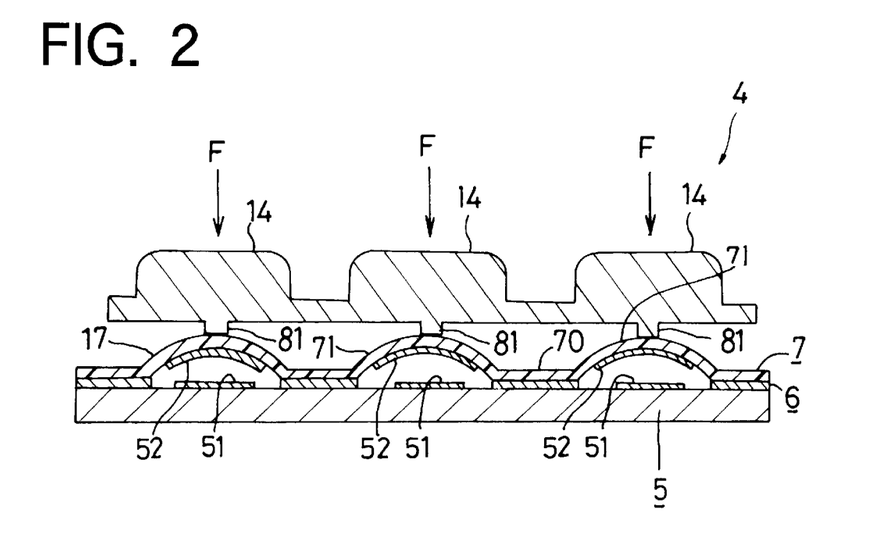
FIG. 2 is an enlarged view in section of the same device at the position of manual keys other than the seesaw key.

With respect to the dome portions 71 to be depressed by the respective manual keys 14 other than the seesaw key 15, the spacer sheet 6 of definite thickness is interposed between the flat sheet portion 70 around each of these dome portions 71 and the base plate 5 as seen in FIG. 2, so that the dome portion 71 is positioned in parallel to the surface of the base plate 5. Accordingly, the depressing force F to be exerted on the manual key 14 acts on the dome portion 71 perpendicular thereto.

Consequently, the dome portion 71 of the dome sheet 7 is inverted symmetrically about the center axis of the dome portion 71 by being depressed by a pusher 81 of the key sheet 8, bringing the contact terminal 52 on the inner surface of the dome portion 71 into contact with the contact electrode 51 on the base plate 5 over a sufficient area to close the contacts. When the dome portion 71 of the manual key 14 is thereafter freed from the pressure, the dome portion 71 elastically restores itself to open the contacts.

Figure 1:
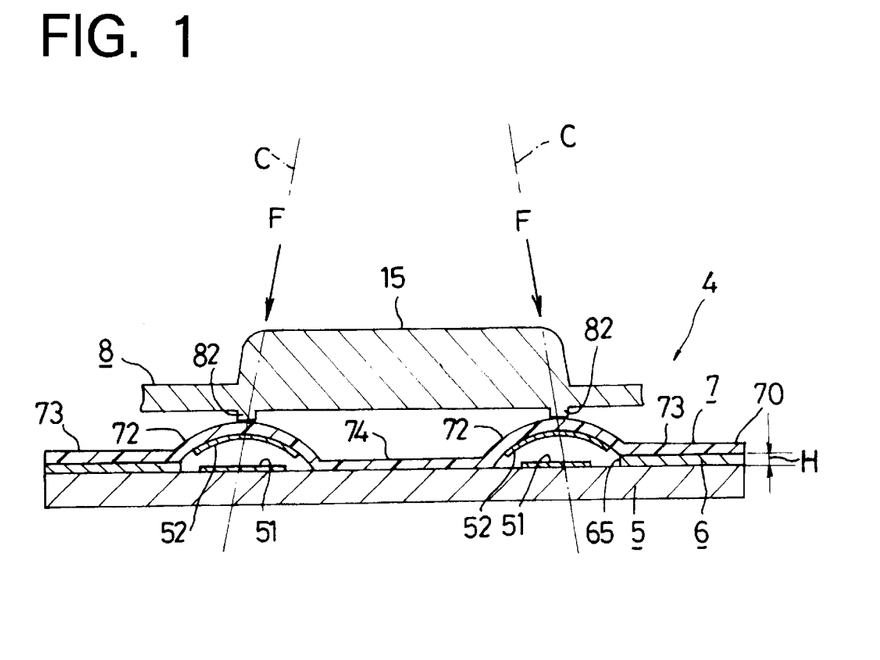
FIG. 1 is an enlarged view in section showing a key input device of the invention at the position of a seesaw key.

With respect to the four dome portions 72 to be depressed by the seesaw key 15, on the other hand, the spacer sheet 6 is interposed between the outer region 73 of the flat sheet portion 70 of the dome sheet 7 and the base plate 5 as shown in FIG. 1, while the inner region 74 of the flat sheet portion 70 is joined to the surface of the base plate 5 through the opening 65 of the spacer sheet 6, with the result that the inner region 74 of the flat sheet portion 70 of the dome sheet 7 and the outer region 73 thereof are at different levels from the surface of the base plate 5, and the inner region 74 is positioned at a level which is lower than the level of the outer region 73 by an amount in match with the thickness (e.g., 0.1 to 0.2 mm) of the spacer sheet 6. For this reason, each of the four dome portions 72 to be selectively depressed by the seesaw key 15 is so inclined as to be positioned at a lower level toward the inner region 74 and at a higher level toward the outer region 73. When one of these dome portions 72 is pushed by depressing the seesaw key 15, the center axis C extending through the dome portion 72 perpendicular thereto is accordingly positioned in the same or approximately the same direction as the direction in which the depressing force F of the seesaw key 15 acts as shown in FIG. 1.

As a result, the dome portion 72 of the dome sheet 7 is inverted symmetrically about the center axis C of the dome portion 72 by being depressed by a pusher 82 of the key sheet 8, bringing the contact terminal 52 on the inner surface of the dome portion 72 into contact with the corresponding contact electrode 51 on the base plate 5 over a sufficient area to close the contacts. Since the dome portion 72 deforms symmetrically about the center axis C at this time, this portion 72 enables the user to feel the same sharp click as when the other manual keys 14 are depressed. The dome portion 72 elastically restores itself to open the contacts when thereafter relieved of the pressure of the seesaw key 15.

With the portable telephone embodying the invention, the seesaw key 15, like the other keys, brings the contact terminal 52 on the inner surface of the dome portion 72 into contact with the corresponding contact electrode 51 on the base plate 5 over a sufficient area as described above, so that the pair of electrode pieces 53, 54 constituting the contact terminal 52 can be reliably connected to each other to close the key contacts.

The device of the present invention is not limited to the foregoing embodiment in construction but can be modified variously by one skilled in the art without departing from the spirit of the invention as set forth in the appended claims. Furthermore, the present invention is not limited only to portable telephones but can be applied to various electronic apparatus having a key input device.

What is claimed is:

1. A key input device comprising a dome sheet provided over a base plate and having a plurality of upwardly bulging dome portions, and a plurality of manual keys disposed above the dome sheet for depressing the respective dome portions, the manual keys including a seesaw key adapted to selectively depress one of dome portions included among the dome portions, each of the dome portions being elastically restorably invertible by being depressed by the corresponding manual key to bring a contact terminal formed on an inner surface of the dome portion into contact with a contact electrode formed on a surface of the base plate and close contacts, the key input device being characterized in that the dome sheet has a flat sheet portion formed around the dome portions and comprising an inner region extending inwardly of the dome portions to be selectively depressed by the seesaw key, and an outer region extending outwardly of the dome portion, a spacer sheet being interposed between the base plate and the dome sheet and being formed with a plurality of circular holes corresponding to the respective dome portions, the interposed spacer sheet providing a difference in level from the surface of the base plate between the inner region of the flat sheet portion of the dome sheet and the outer region thereof, the inner region being positioned at a lower level than the outer region by an amount that matches the thickness of the spacer sheet, wherein the inner region is positioned between the dome portions corresponding to the seesaw key and the outer region is positioned outside a boundary of the dome portions corresponding to the seesaw key.

2. A key input device according to claim 1 wherein the spacer sheet has an opening formed inwardly of circular holes corresponding to the respective dome portions to be selectively depressed by the seesaw key and including the circular holes, and the dome sheet has its flat sheet portion joined at the inner region to the surface of the base plate through the opening.

* * * * *